(12) United States Patent
Alton (10) Patent No.: US 11,498,687 B1
(45) Date of Patent: Nov. 15, 2022

(54) PARACHUTE RELEASE FAIL-SAFE

(71) Applicant: Government of the United States, as represented by the Secretary of the Air Force, Wright-Patterson AFB, OH (US)

(72) Inventor: Travis Alton, Cabot, AR (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 378 days.

(21) Appl. No.: 16/912,776

(22) Filed: Jun. 26, 2020

Related U.S. Application Data (60) Provisional application No. 62/874,537, filed on Jul. 16, 2019.

(51) Int. Cl.
*B64D 17/58* (2006.01)

(52) U.S. Cl.
CPC .................... *B64D 17/58* (2013.01)

(58) Field of Classification Search
CPC ...... B64D 17/52; B64D 17/46; B64D 17/386; B64D 17/64; B64D 17/34; B64D 17/383; B64D 17/58; B64C 2201/185
See application file for complete search history.

(56) References Cited

U.S. PATENT DOCUMENTS

| | | | | |
|---|---|---|---|---|
| 2,852,217 A * | 9/1958 | Engelhardt | .......... | B64D 17/383 244/151 B |
| 3,032,303 A * | 5/1962 | Hatfield | ................. | B64D 17/52 244/149 |
| 3,281,098 A | 10/1966 | Stencel | | |
| 3,595,501 A * | 7/1971 | Stencel | .................. | B64D 17/54 244/142 |
| 4,042,194 A | 8/1977 | Frost | | |
| 4,262,865 A | 4/1981 | Straith | | |
| 4,428,102 A * | 1/1984 | Brownell | ............... | B64D 17/38 244/151 B |
| 4,783,027 A * | 11/1988 | Jones | ..................... | B64D 17/56 244/151 B |
| 5,687,931 A * | 11/1997 | Hogan | ................... | B64D 17/38 244/151 B |
| 7,264,205 B2 * | 9/2007 | Fox, Jr. | .................. | B64D 17/62 244/151 B |
| 8,033,507 B2 * | 10/2011 | Fox, Jr. | ................ | B64D 17/383 244/151 B |
| 8,313,063 B2 * | 11/2012 | Fox, Jr. | ................ | B64D 17/383 244/151 B |
| 9,056,678 B2 * | 6/2015 | Forsans | .................. | B64D 17/56 |
| 2011/0303793 A1 * | 12/2011 | Fox, Jr. | ............... | B64D 17/383 244/151 B |

* cited by examiner

*Primary Examiner* — Justin M Benedik
(74) *Attorney, Agent, or Firm* — AFMCLO/JAZ; Matthew D. Fair (57) ABSTRACT

A parachute release apparatus includes at least one parachute connector releasably attached thereto. A delay release timer coupled to the apparatus is movable between locked and unlocked positions at a predetermined time after deployment of the parachute to permit release of the parachute connector after landing. A fail-safe device positioned adjacent the delay release timer is operable to hold the delay release timer in the locked position until the fail-safe device is removed after deployment of a parachute.

21 Claims, 9 Drawing Sheets

PARACHUTE RELEASE FAIL-SAFE

RIGHTS OF THE GOVERNMENT

The invention described herein may be manufactured and used by or for the Government of the United States for all governmental purposes without the payment of any royalty.

TECHNICAL FIELD

The present disclosure generally relates to a release mechanism for a parachute, and more particularly, but not exclusively to a parachute release mechanism having a fail-safe device to prevent unintended or premature release of the parachute from the release mechanism.

BACKGROUND

Parachute release mechanisms are designed to release the parachute from a cargo load after landing. A failure of the parachute release mechanism occurs if there is either a delay to the parachute detachment after landing on the ground or premature release prior to landing. An early release of the parachute can cause a loss of the entire load prior to landing. Existing systems have various shortcomings, drawbacks, and disadvantages relative to certain applications. Accordingly, there remains a need for further contributions in this area of technology.

SUMMARY

One embodiment of the present disclosure includes a unique parachute release mechanism having fail-safe device to prevent untimely release of the parachute. Other embodiments include apparatuses, systems, devices, hardware, methods, and combinations wherein the fail-safe device is detached from the release mechanism after deployment to permit a timing mechanism to move into an open or unlocked position so that the parachute will be released upon landing. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure provides a fail-safe device for a parachute release mechanism. The parachute release device is used in aerial delivery to detach parachutes from the air dropped cargo after the cargo has reached the ground. The fail-safe device will prevent an unintentional mid-air release of the parachute which otherwise would likely result in the total destruction of the air dropped cargo. The fail-safe device physically prevents a timing mechanism from releasing early by restricting movement from a closed position to an open position. The fail-safe device does not interfere, impede or hinder rigging methods or procedures commonly practiced and does not require any modification or reengineering effort to use with existing timer release mechanisms.

Figure 1:
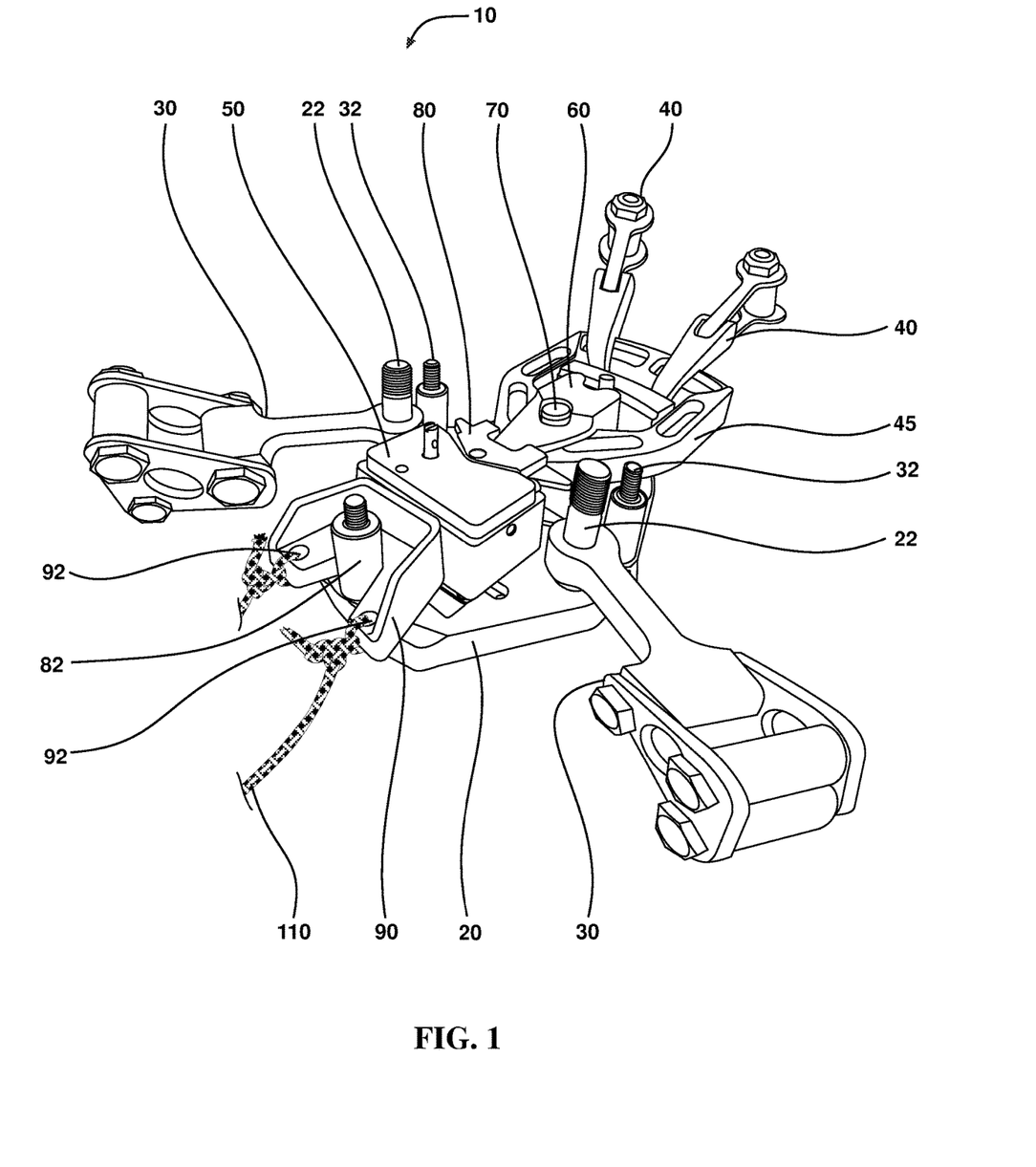
FIG. 1 is a perspective view of a partially assembled parachute release mechanism with a fail-safe device according one embodiment of the present disclosure.
Figure 2:
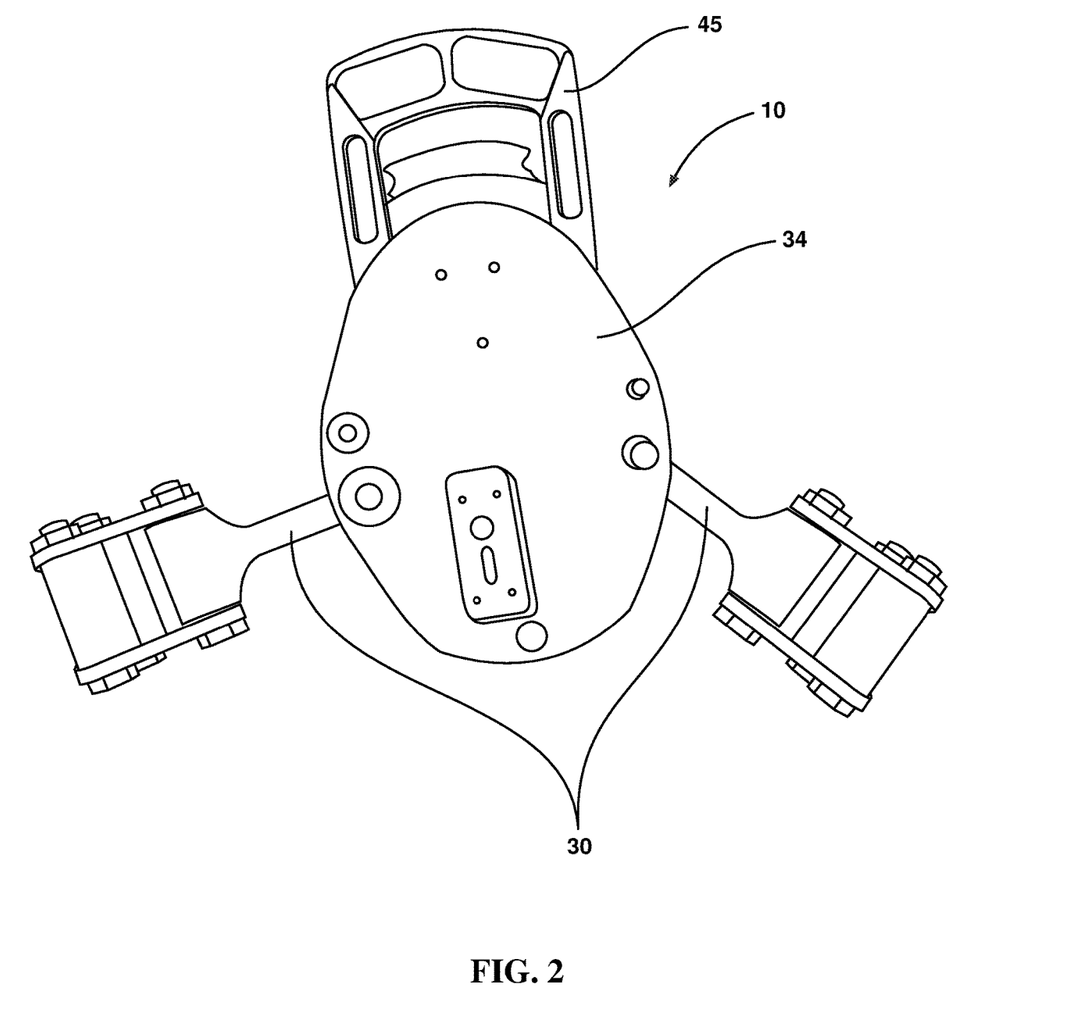
FIG. 2 top view of the parachute release mechanism of FIG. 1 with a face plate connected thereto.

Referring now to FIGS. 1 and 2, perspective views of partially assembled parachute release devices 10 are illustrated. The parachute release device 10 includes a back plate 20 with a pair of threaded side studs 22 extending therefrom. A pair of lower suspension links 30 are pivotably attached to the side studs 22. The lower suspension links are connectable to a cargo load (not shown). Additional threaded studs 32 are positioned adjacent the side studs 22 and are configured to threadingly connect to a faceplate 34 (see FIG. 2). A pair of parachute release connectors 40 are configured to connect a parachute (not shown) to the release device 10 and release the parachute after the load has landed as will be described in more detail below. The parachute release connectors 40 are releasably connectable to an upper suspension link 45 that is pivotably connected to the back plate 20.

A timing block mechanism 50 is coupled to the back plate 20 and functions to lock and unlock the parachute release connectors 40 at a predetermined time after being dropped from an airplane. When the timing block mechanism 50 unlocks, the parachute release connectors 40 are able to disengage from the upper suspension link 45 upon landing on the ground. If the timing block mechanism 50 unlocks too early (e.g. prior to parachute stabilization during a drop) after being dropped from the aircraft, the initial jostling in the air can move the release device 10 into a position whereby the parachute release connectors 40 become disengaged in midair causing the cargo to drop without the parachute.

A toggle 60 holds the parachute release connectors 40 in an engaged position until the timing block mechanism 50 unlocks. The toggle is pivotably connected to the device 10 via a toggle shaft 70. A toggle lockslide 80 prevents the toggle from pivoting and thus releasing the parachute release connectors 40 until timing block mechanism 50 is unlocked. This will be explained in more detail below. A fail-safe device 90 is positioned between the timing block mechanism 50 and a center stud 82 when in a locked condition. When the fail-safe device 90 is in the locked condition, the timing block mechanism 50 is prevented from sliding downward to an unlocked position. A through aperture 92 is formed in the fail-safe device 90 on either side thereof such that a tie cord 110 can be connected thereto.

Figure 3:
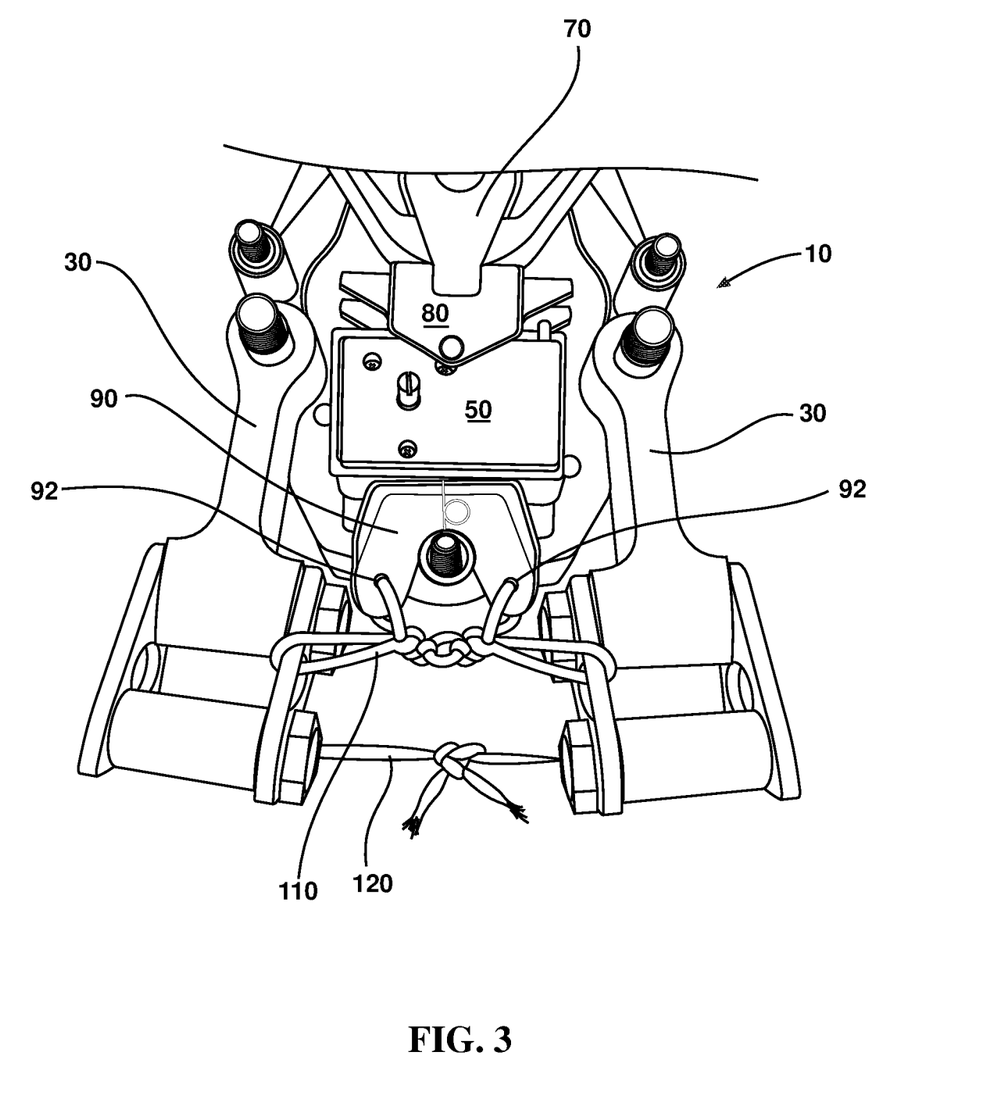
FIG. 3 is another perspective view of the parachute release mechanism of FIG. 1 with the fail-safe device having a tie cord connected to the lower suspension links.

Referring now to FIG. 3, the fail-safe tie cord 110 can be inserted through the apertures 92 and connected to the lower suspension links 30. An optional link tie 120 can temporarily connect each of the lower suspension links 30 together. The fail-safe tie cord 110 is designed to pull the fail-safe device 90 apart and out of the locked position when lower suspension links 30 move apart from one another due to the weight of the cargo load after the parachute is deployed. A link tie 120 can be used to prevent the lower suspension links 30 from moving apart during loading and handling prior to deployment of the parachute. In this manner the fail-safe device 90 cannot be inadvertently removed by moving the lower suspension links 30 prior to deploying the parachute for a cargo drop. The material for fail-safe tie cord 110 and the link tie 120 may be of any type that meets the mission requirements. In some forms, the tie material for fail-safe tie cord 110 and the link tie 120 may be the same and in other forms the material may be different. The cord 110 and/or link 120 may be formed as a rope, a cable, a string, a wire or other types known to those skilled in the art. In some forms the link tie 120 may include a breakaway connection designed to separate when a predetermined load is passed through the link tie 120.

The link tie 120 is designed to break and permit the lower suspension links 30 to move apart from one another during parachute deployment such that the tie cord 110 can then pull the fail-safe device 90 apart. The fail-safe tie 110 is designed to be stronger than a break-away portion of the fail-safe device 90. In this manner, the fail-safe device 90 will be separated into at least two portions as they are pulled away from the locked location when the lower suspension links 30 move apart from one another during parachute deployment. After the fail-safe device 90 is removed, the timing block mechanism 50 is then free to slide into an unlocked position when the timer is triggered at a predetermined time after deployment.

Figure 4:
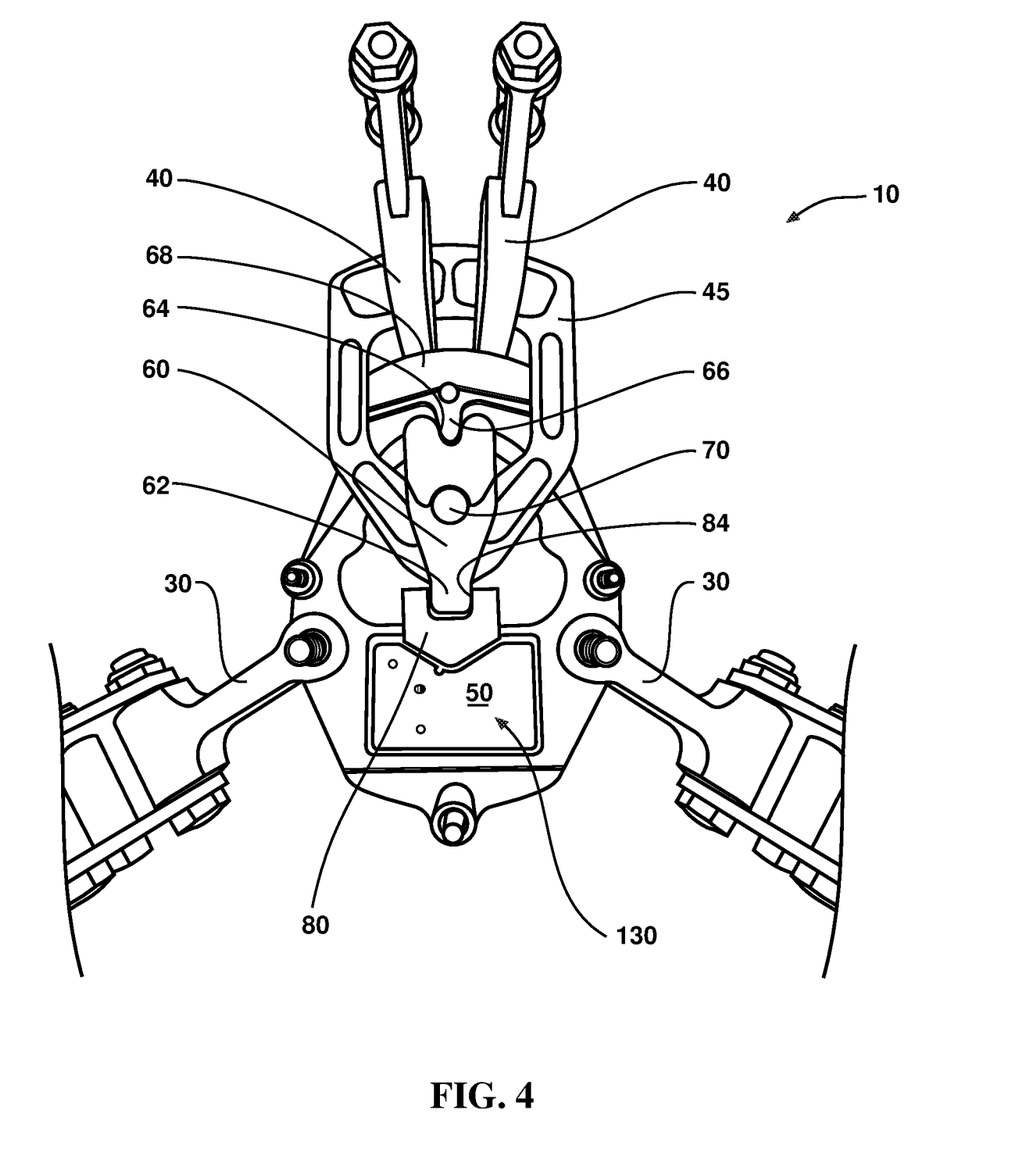
FIG. 4 is a top view of the parachute release mechanism with a delay release timer armed and engaged with a toggle after the fail-safe device has been removed.

FIG. 4, shows the parachute release device 10 without the fail-safe device 90 and the timing block mechanism 50 in a locked position 130. The toggle 60 includes a toggle tip 62 that is engaged with a U-shaped slot 84 formed in the toggle lock slide 80 at one end thereof. A toggle groove 64 is formed in an opposing end of the toggle 60 to receive a tongue 66 extending from a retaining clamp 68. The retaining clamp 68 is configured to prevent the parachute release connectors 40 from disengaging when the device is in a locked position 130.

Figure 5:
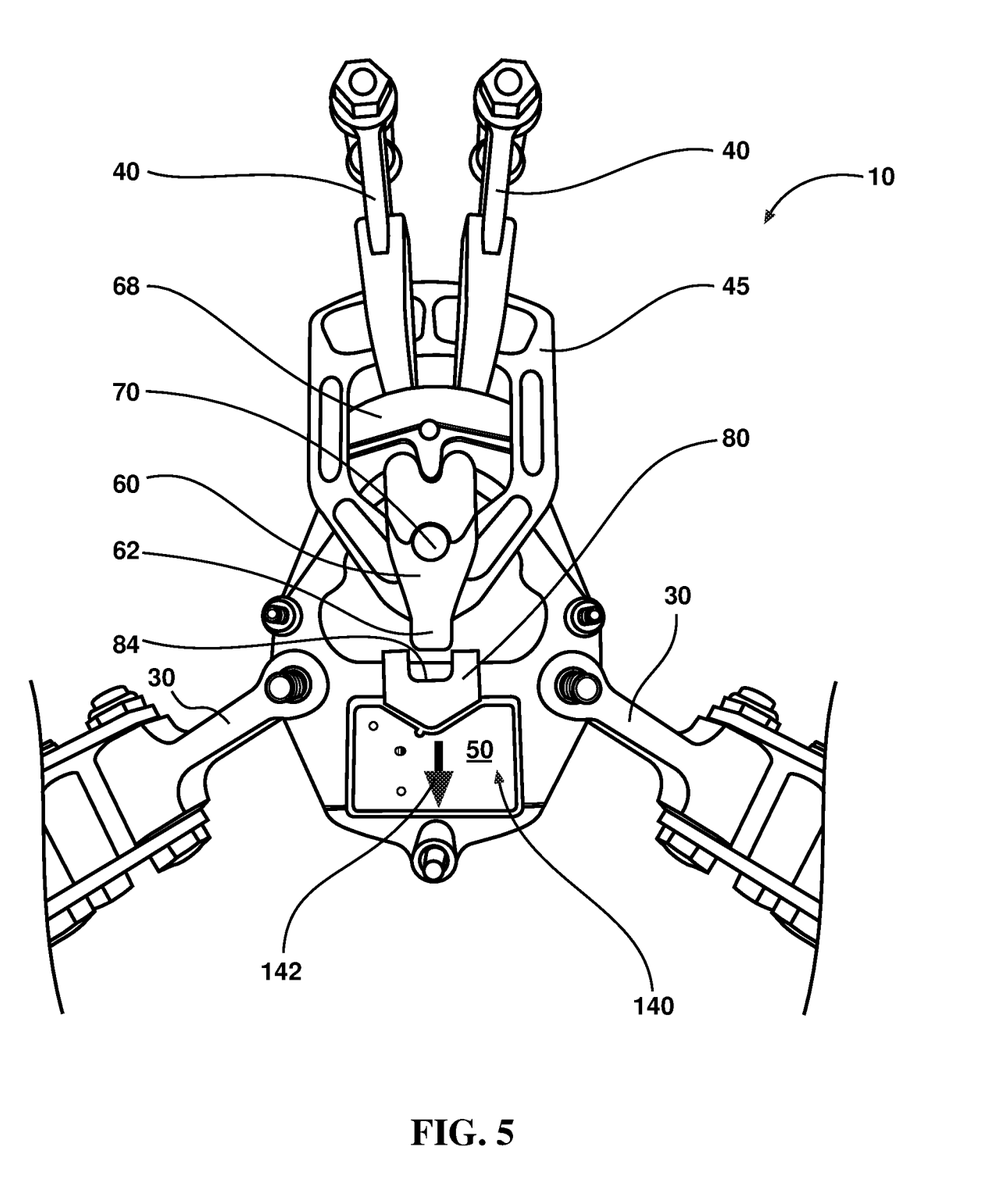
FIG. 5 is a top view of the parachute release mechanism shown in FIG. 3 with the delay release timer moved to a disengaged and unlocked position.

FIG. 5 shows the parachute release device 10 in an unlocked position 140. The unlocked position occurs when the timing block mechanism 50 slides downward in the direction of arrow 142 such that the U-shaped groove 84 of the toggle lockslide 80 follows the timing block mechanism 50 during an unlocking process and slides out of engagement with the toggle tip 62 of the toggle 60.

Figure 6:
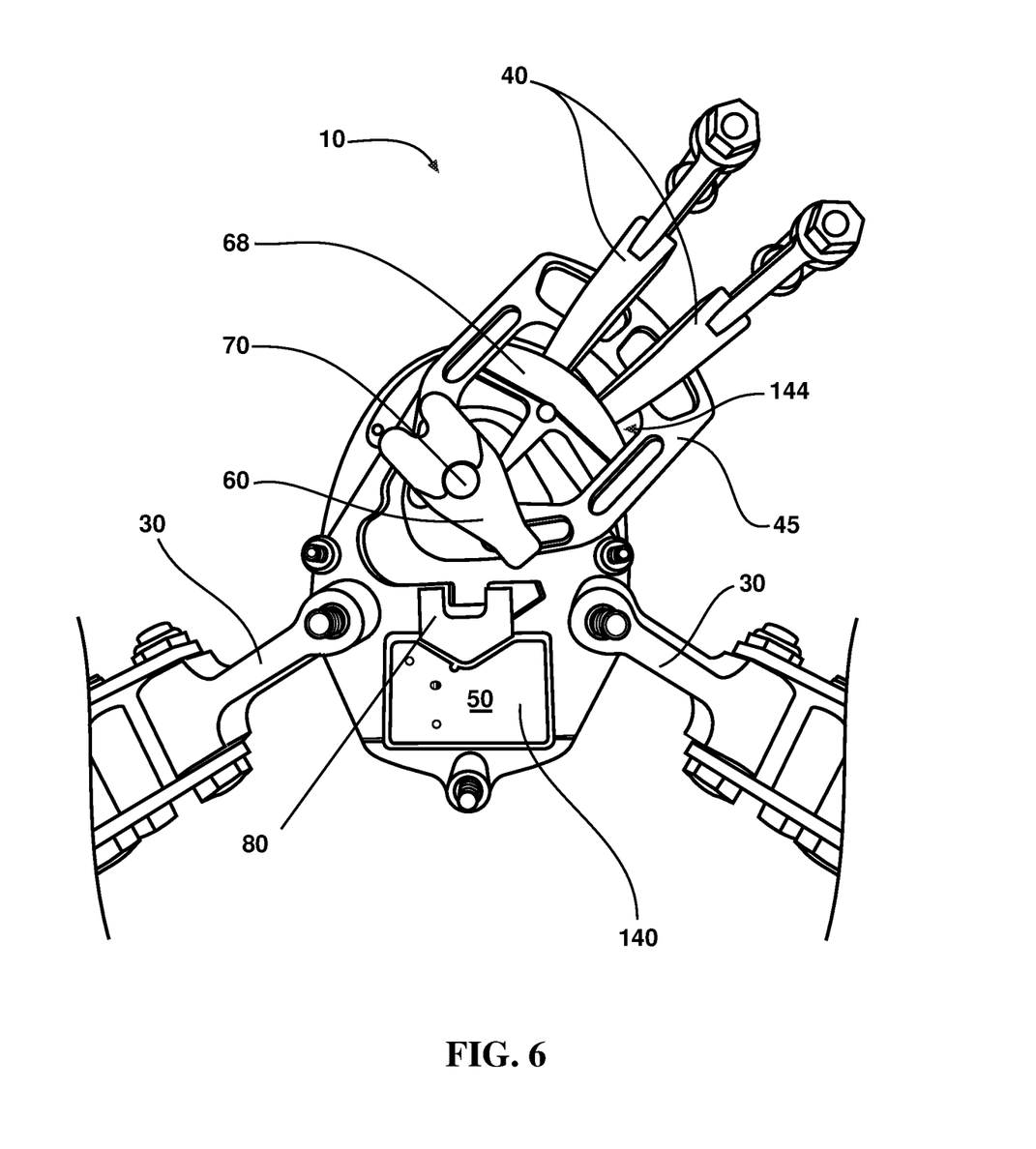
FIG. 6 is a top view of the parachute release mechanism of FIG. 1 with the upper suspension link rotated and the parachute release connectors in an unlocked condition.

FIG. 6 shows the parachute release device 10 in an unlocked position 140 and the upper suspension link and retaining clamp 68 pivoted after the toggle 60 is no longer lockingly engaged retaining clamp 68. This condition occurs after the cargo has landed and the parachute continues to pull on the upper suspension links 40 causing them to rotate out of position. After the retaining clamp 68 is free from engagement of the toggle 60, the parachute release connectors can slide out of engagement with the retaining clamp 68 and thus the parachute (not shown) is now disconnected from the release device 10.

Figure 7:
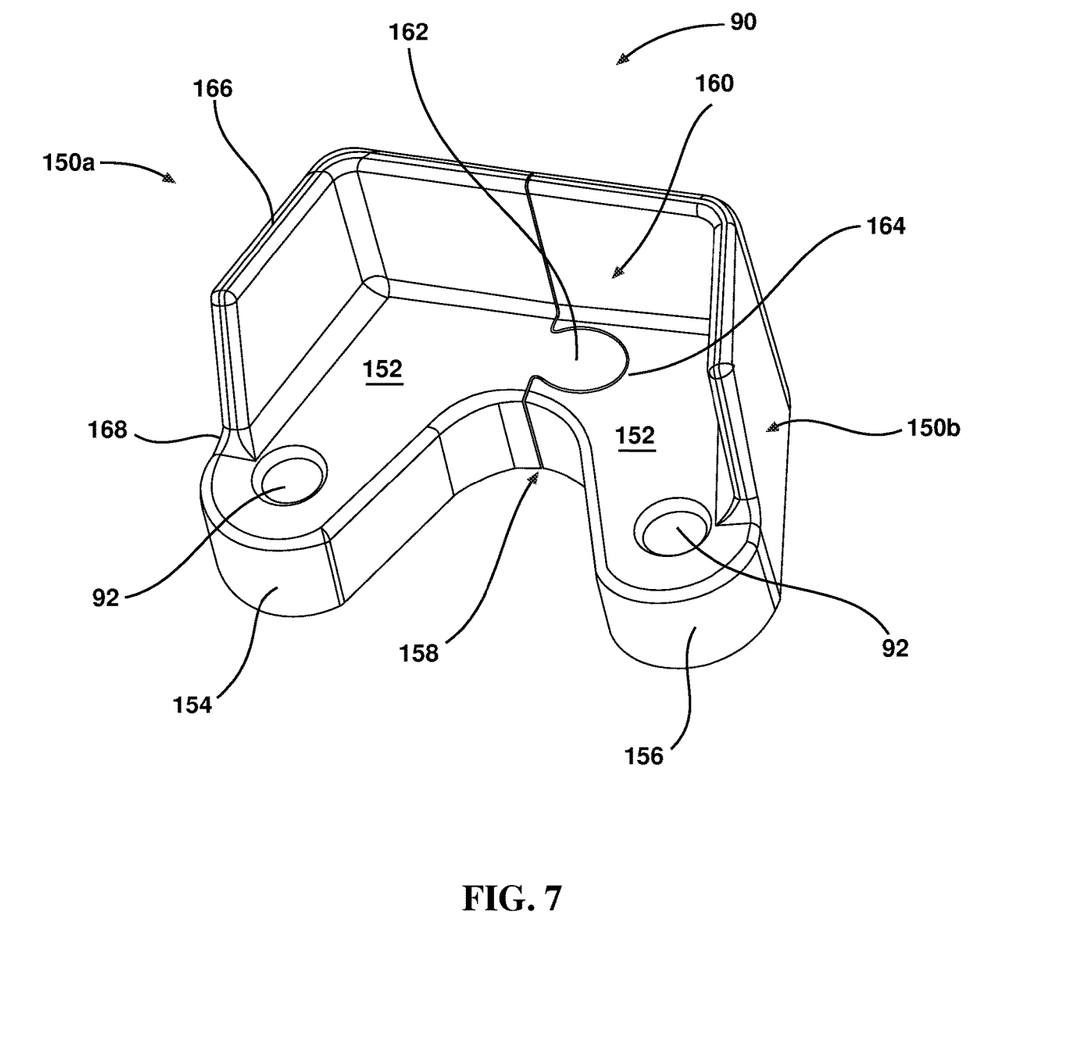
FIG. 7 is a top perspective view of the fail-safe device.
Figure 8:
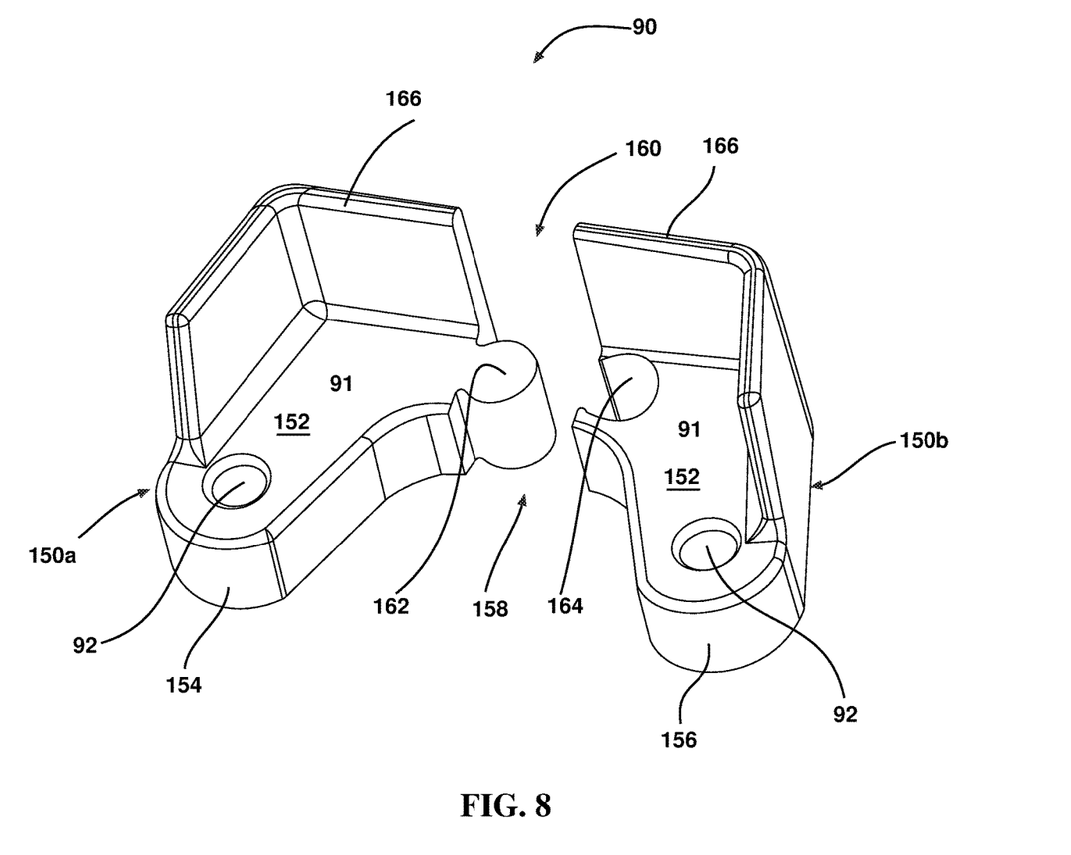
FIG. 8 is a top perspective view of the fail-safe device of FIG. 7 separated into two pieces.
Figure 9:
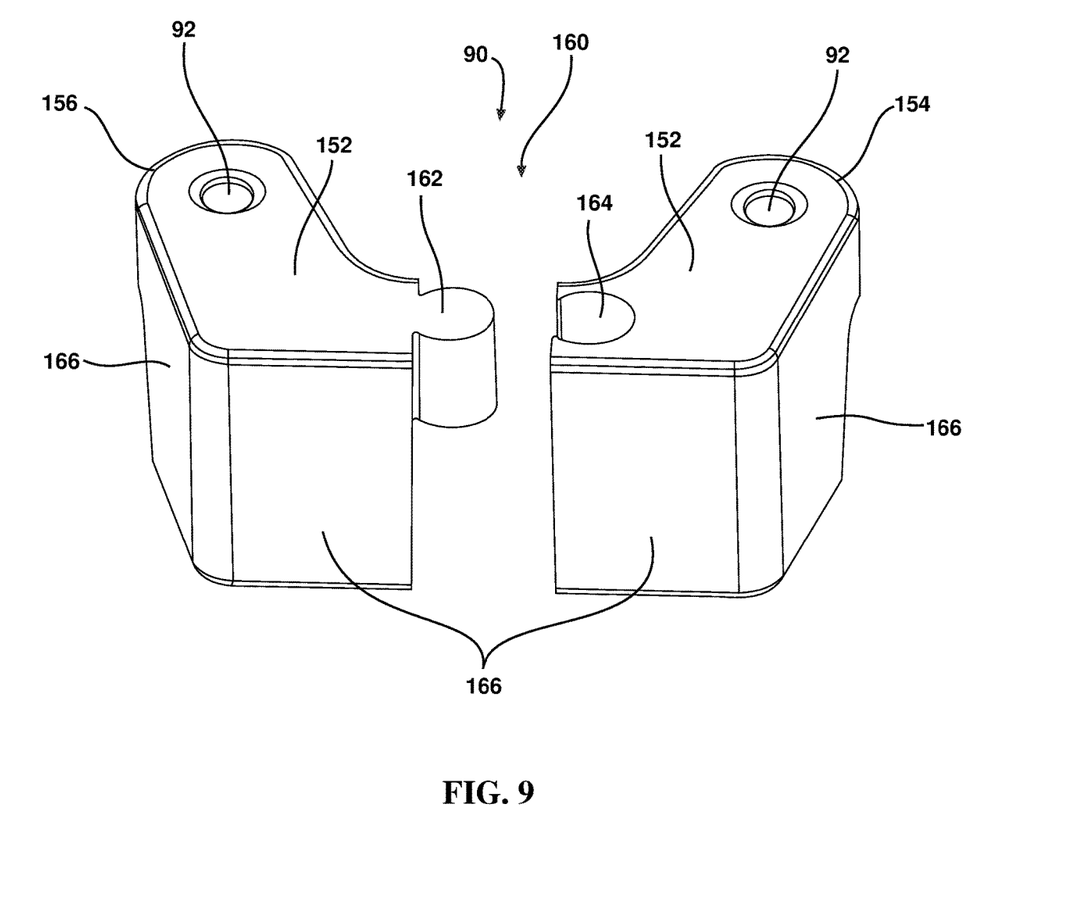
FIG. 9 is a bottom perspective view of the fail-safe device of FIG. 8.

Referring now to FIGS. 7-9, various perspective views of the fail-safe device 90 are depicted. The fail-safe device 90 includes a first portion 150a and a second portion 150b that can be separated and displaced after the parachute is deployed. Each of the portions 150a, 150b are connectable together to form a base wall 152 having a first leg extension 154 and a second leg extension 156 protruding outward with a recessed slot 158 formed there between. The slot 158 is configured to engage about the center stud 82 (See FIG. 1) to restrain movement of the fail-safe device 90 when connected thereto. The through apertures 92 formed in the first and second leg extensions 154, 156 are configured to receive the tie cord 110 so that each of the portions 150a, 150b can be connected to the lower suspension links 30 as discussed above. In alternate embodiments, other means for connecting the fail-safe device 90 to the suspension links 30 are also contemplated by the present disclosure. For example, and without limitation, posts or other connections may extend from the fail-safe device to permit the tie cord 110 to affix thereto.

The first and second portions 150a, 150b can be connected together with a breakaway connection 160. In one form, the breakaway connection 160 can include a tongue 162 and groove 164 connector. The tongue 162 and groove 164 connector can be designed to break apart when the lower suspension links 30 are pulled apart during deployment of the parachute and cargo apparatus. Other types of breakaway connections such as by way of example and not limitation a thin wall or etched portion are also contemplated herein as would be understood by one skilled in the art. A back wall extension 166 can be optionally formed around a portion of the perimeter 168 of the base wall 152 to provide greater contact surface area with the timing block mechanism 50.

FIG. 8 shows the fail-safe device 90 with the first and second portions 150a, 150b separated prior to assembly. When the first and second portions 150a, 150b break away, the design can be such that a portion of the fail-safe device 90 can actually break due to the stress exceeding the ultimate material limit. In some forms the tongue 162 and groove 164 configuration may slidingly disengage from one another without actually breaking the material. The material used to form the fail-safe device 90 can be selected from any number of types, such as by way of example and not limitation plastics, composites, metals or combinations thereof. FIG. 9 shows a bottom view of the fail-safe device 90 with the first and second portions 150a, 150b separated prior to assembly.

In one aspect the present disclosure includes a parachute release apparatus comprising: a housing having first and second ends; at least one parachute connector releasably attached to the housing at the first end thereof; a pair of lower suspension links attached to the housing at the second end thereof; a toggle mechanism rotatably connected to the housing and releasably connectable to the at least one parachute connector; a delay release timer coupled to the toggle mechanism movable between first and second positions, wherein the at least one parachute connector is locked to the housing in the first position and releasable from the housing in the second position; and a fail-safe device positioned adjacent the delay release timer to hold the delay release timer in the first position until the fail-safe device is removed from the housing.

In refining aspects, the fail-safe device includes at least two separable portions; wherein the two separable portions are connected via a breakaway connection; wherein the first portion is connected to one of the lower suspension links and the second portion is connected to the other of the lower suspension links; wherein the fail-safe device includes a tie cord connected to each of the lower suspension links; wherein the tie cord includes a first tie cord connected between the first portion and one of the lower suspension links and a second tie cord connected between the second portion and the other one of the lower suspension links; wherein the tie cord is configured to pull the first and second portions apart when the parachute is deployed and a load attached thereto pulls the suspension links apart from one another; wherein the fail-safe device is removed from the housing when the first and second portions are pulled apart; further comprising a tie link connected between the lower suspension links to prevent separation of the lower suspension links prior to parachute deployment; wherein the tie cord and the tie link is formed as one of a string, a rope or a wire; wherein the tie cord is stronger than the breakaway connection of the fail-safe device.

In another aspect, the present disclosure includes a fail-safe device for a parachute release apparatus comprising: a first portion and a second portion connected together with a breakaway connection; a through aperture formed in each of the first and second portions; and a tie cord connecting the first and second portions of the fail-safe device to first and second lower suspension links of a parachute connector mechanism, respectfully.

In refining aspects, the breakaway connection include a tongue and groove connection; the material of the first and second portions is defined by a plastic and/or a composite material; the tie cord is stronger than the breakaway connection; the tie cord pulls the first and second portions apart when the first and second lower suspension links separate upon deployment of a parachute; the first and second lower suspension links are connectable to a cargo load; and the fail-safe device engages a delay release timer mechanism to prevent the delay release timer mechanism from moving to an open position until the first and second portions of the fail-safe device are separated and displaced.

In another aspect, a method comprises: providing a parachute release mechanism to releasably connect a parachute to a load; coupling a delay release timer to the parachute release mechanism; positioning a fail-safe device adjacent the delay release timer; and preventing the delay release timer from moving to an open position while the fail-safe device is installed with the parachute release mechanism.

In refining aspects, the method further comprises removing the fail-safe device after the parachute is deployed; and wherein the removing includes a pair of lower suspension links pulling the fail-safe device out of position such that the delay release timer is free to move to the open position and the parachute can be released after landing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A parachute release apparatus comprising:
   a housing having first and second ends;
   at least one parachute connector releasably attached to the housing at the first end thereof;
   a pair of lower suspension links attached to the housing at the second end thereof;
   a toggle mechanism rotatably connected to the housing and releasably connectable to the at least one parachute connector;
   a delay release timer coupled to the toggle mechanism movable between first and second positions, wherein the at least one parachute connector is locked to the housing in the first position and releasable from the housing in the second position; and
   a fail-safe device positioned adjacent the delay release timer to hold the delay release timer in the first position until the fail-safe device is removed from the housing.

2. The parachute release apparatus of claim 1, wherein the fail-safe device includes at least two separable portions.

3. The parachute release apparatus of claim 2, wherein the two separable portions are connected via a breakaway connection.

4. The parachute release apparatus of claim 2, wherein the first portion is connected to one of the lower suspension links and the second portion is connected to the other of the lower suspension links.

5. The parachute release apparatus of claim 2, wherein the fail-safe device includes a tie cord connected to each of the lower suspension links.

6. The parachute release apparatus of claim 5, wherein the tie cord includes a first tie cord connected between the first portion and one of the lower suspension links and a second tie cord connected between the second portion and the other one of the lower suspension links.

7. The parachute release apparatus of claim 5, wherein the tie cord is configured to pull the first and second portions apart when the parachute is deployed and a load attached thereto pulls the suspension links apart from one another.

8. The parachute release apparatus of claim 7, wherein the fail-safe device is removed from the housing when the first and second portions are pulled apart.

9. The parachute release apparatus of claim 5, further comprising a tie link connected between the lower suspension links to prevent separation of the lower suspension links prior to parachute deployment.

10. The parachute release apparatus of claim 9, wherein the tie cord and the tie link is formed as one of a string, a rope or a wire.

11. The parachute release apparatus of claim 5, wherein the tie cord is stronger than the breakaway connection of the fail-safe device.

12. A fail-safe device for a parachute release apparatus comprising:

a first portion and a second portion connected together with a breakaway connection;

a through aperture formed in each of the first and second portions; and a tie cord connecting the first and second portions of the fail-safe device to first and second lower suspension links of a parachute connector mechanism, respectfully.

13. The fail-safe device of claim 12, wherein the breakaway connection include a tongue and groove connection.

14. The fail-safe device of claim 12, wherein the material of the first and second portions is defined by a plastic and/or a composite material.

15. The fail-safe device of claim 12, wherein the tie cord is stronger than the breakaway connection.

16. The fail-safe device of claim 12, wherein the tie cord pulls the first and second portions apart when the first and second lower suspension links separate upon deployment of a parachute.

17. The fail-safe device of claim 12, wherein the first and second lower suspension links are connectable to a cargo load.

18. The fail-safe device of claim 12, wherein the fail-safe device engages a delay release timer mechanism to prevent the delay release timer mechanism from moving to an open position until the first and second portions of the fail-safe device are separated and displaced.

19. A method comprising:

providing a parachute release mechanism to releasably connect a parachute to a load;

coupling a delay release timer to the parachute release mechanism;

positioning a fail-safe device adjacent the delay release timer; and preventing the delay release timer from moving to an open position while the fail-safe device is installed with the parachute release mechanism.

20. The method of claim 19, further comprising removing the fail-safe device after the parachute is deployed.

21. The method of claim 20, wherein the removing includes a pair of lower suspension links pulling the fail-safe device out of position such that the delay release timer is free to move to the open position and the parachute can be released after landing.

* * * * *